US012094353B2

(12) United States Patent
Stoppok et al.

(10) Patent No.: US 12,094,353 B2
(45) Date of Patent: Sep. 17, 2024

(54) SYSTEM, DEVICE AND METHOD FOR SEQUENCING MODES OF TRANSPORTATION OR ITEMS AND THE LIKE

(71) Applicant: SITA Information Networking Computing B.V., Amsterdam (NL)

(72) Inventors: Dominik Johannes Stoppok, Amsterdam (NL); Dietmar Wilhelm Dippe, Amsterdam (NL)

( * ) Notice: Subject to any disclaimer, the term of this patent is extended or adjusted under 35 U.S.C. 154(b) by 368 days.

(21) Appl. No.: 17/414,833

(22) PCT Filed: Dec. 18, 2019

(86) PCT No.: PCT/IB2019/061021
§ 371 (c)(1),
(2) Date: Jun. 16, 2021

(87) PCT Pub. No.: WO2020/141388
PCT Pub. Date: Jul. 9, 2020

(65) Prior Publication Data

US 2022/0020281 A1 Jan. 20, 2022

(30) Foreign Application Priority Data

Dec. 19, 2018 (GB) ...................................... 1820710

(51) Int. Cl.
*G06G 7/70* (2006.01)
*G08G 5/00* (2006.01)
*G08G 5/06* (2006.01)

(52) U.S. Cl.
CPC ........... *G08G 5/065* (2013.01); *G08G 5/0026* (2013.01); *G08G 5/003* (2013.01); *G08G 5/0043* (2013.01)

(58) Field of Classification Search
CPC ...... G08G 5/065; G08G 5/0026; G08G 5/003; G08G 5/0043
See application file for complete search history.

(56) References Cited

U.S. PATENT DOCUMENTS 6,278,965 B1 8/2001 Glass et al.
8,554,457 B2 10/2013 White et al.
(Continued)

FOREIGN PATENT DOCUMENTS

FR 3049740 A1 10/2017
GB 2327517 A 1/1999
WO 2020141388 A1 7/2020

OTHER PUBLICATIONS

International Search Report & Written Opinion, issued in International Application No. PCT/IB2019/061021, mailed Apr. 24, 2021; 13 pages.

*Primary Examiner* — Adam M Alharbi
(74) *Attorney, Agent, or Firm* — Morris, Manning & Martin, LLP; Daniel E. Sineway, Esq.; Adam J. Thompson, Esq.

(57) ABSTRACT

A computer processing system for optimising a sequence of aircraft at an airport is disclosed. The system comprises a module (201) configured to receive flight plan data associated with a plurality of journeys between an origin and destination wherein each journey is associated with a different aircraft and wherein the flight plan data comprises flight schedule data associated with the plurality of different journeys; a second module (205) coupled to the first module wherein the second module is configured to determine an aircraft taxi time, EXOT, based on the flight plan data; a third module (203) coupled to the first module (201) and the second module (205) wherein the third module (203) is configured to determine a target take-off time, TTOT, associated with each of the plurality of different journeys
(Continued)

wherein the target take-off time is determined based on the taxi time, EXOT, and the flight plan data.

20 Claims, 3 Drawing Sheets

(56) References Cited

U.S. PATENT DOCUMENTS

| | | | | |
|---|---|---|---|---|
| 10,467,913 | B1 * | 11/2019 | Suiter | G08G 5/0021 |
| 2010/0063716 | A1 | 3/2010 | Brozat | |
| 2012/0221233 | A1 | 8/2012 | White et al. | |
| 2013/0013182 | A1 | 1/2013 | Bertsimas et al. | |
| 2014/0278036 | A1 | 9/2014 | Ince et al. | |
| 2016/0075436 | A1 * | 3/2016 | Rossano | G06F 3/04847 715/771 |
| 2016/0314692 | A1 * | 10/2016 | Bahrami | G08G 5/0013 |
| 2018/0061243 | A1 * | 3/2018 | Shloosh | G08G 5/0043 |
| 2019/0316909 | A1 * | 10/2019 | White | G06N 5/02 |

* cited by examiner

SYSTEM, DEVICE AND METHOD FOR SEQUENCING MODES OF TRANSPORTATION OR ITEMS AND THE LIKE

CROSS REFERENCE TO RELATED APPLICATIONS

This application is a national phase application of, and claims benefit of and priority to International Application No. PCT/IB2019/061021, filed Dec. 18, 2019, entitled IMPROVED SYSTEM, DEVICE AND METHOD FOR SEQUENCING MODES OF TRANSPORTATION OR ITEMS AND THE LIKE," which claims priority to Great Britain Application No. 1820710.0, filed Dec. 19, 2018, entitled "IMPROVED SYSTEM, DEVICE AND METHOD FOR SEQUENCING MODES OF TRANSPORTATION OR ITEMS AND THE LIKE," the disclosures of which are incorporated herein by reference as if set forth herein in their entireties.

FIELD OF THE INVENTION

This invention relates to a system, apparatus, method or computer program for generating a sequence for resource optimisation. In particular, but not exclusively, this invention relates to a system, apparatus, method or computer program for generating a departure sequence for transportation means at a transportation hub. Even more particularly, this invention relates to a system, apparatus, method or computer program for generating a departure sequence for aircraft at an airport, for vessels at a seaport, or for trains at a train station.

BACKGROUND OF THE INVENTION

Currently, departures at airports are controlled by a tower controller on a first come first serve basis. As part of the departure procedure, a pilot may manually request departure clearance by radio communication with the tower controller, once the pilot confirms that the aircraft is ready for departure. Further, the take-off sequence or in other words the order in which a number of different aircraft are permitted to take-off from a particular runway is determined based on when a particular aircraft arrives at the runway. This results in a suboptimal take-off sequence, unused runway capacity, and unnecessary delays.

SUMMARY OF THE INVENTION

Embodiments of the invention seek to address the above problems by providing a computer implemented sequencing system which determines the sequence or order of a plurality of flights. The system determines a start-up time and a take-off time based on flight plan data and associates the start-up time and take-off time with the flight plan data.

Embodiments of the invention have the advantage that, for a typical airport with 3 runways and 3 terminals, the taxi-out time is reduced usually by about 40 seconds per flight. Further, embodiments of the invention provide an improved ATFM slot adherence which may be increased by about 5% to 90%. Further, embodiments of the invention have the advantage that the average ATFM delay share index may be reduced from 1.1 to 0.85. This results in 20,500 less ATFM delay minutes.

Further, embodiments of the invention improve take-off time accuracy from an average of 6.0 minutes to 20 seconds per flight. In addition, embodiments of the invention improve take-off time predictability, which is a measure of the standard deviation of take-off accuracy, from about 14.6 minutes to 3.9 minutes per flight.

Finally, because embodiments of the invention are able to provide an improved departure sequence for aircraft, embodiments of the invention may result in annual fuel savings of 2,300 Tonnes, a reduction of taxi minutes of 190,000, a 7,300 Tonnes reduction of CO2, a 78.9 Tonne reduction in CO, and a 8.8 Tonne reduction in NOx, as well as a delay reduction of 20,500 minutes.

BRIEF DESCRIPTION OF THE DRAWINGS

An embodiment of the invention will now be described, by way of example only, and with reference to the accompanying drawings, in which.

DETAILED DESCRIPTION

The following exemplary description is based on a system, apparatus, and method for use in the aviation industry. However, it will be appreciated that the invention may find application outside the aviation industry, particularly in other transportation industries, as well as in production lines or indeed in any industry, such as in the packaging or delivery industry where the order of resources such as products, items or modes of transport in a process is critical to the efficient handling of the process. Similarly, it will be appreciated that embodiments of the invention may find application in the healthcare industry, particularly for optimising the use of resources such as operating theatres.

Thus, embodiments of the invention find application in the travel industry in general, such as rail, coach, car, as well for delivery, courier and healthcare industries where the sequence or order of resources may be optimised.

The following embodiments described may be implemented using a C++ programming language using for example an OpenCV library. However, this is exemplary and other programming languages known to the skilled person may be used such as JAVA.

System Operation

An embodiment of the invention will now be described referring to the functional component diagram of FIG. 1 which shows the system as a whole which shows a plurality of integrated software applications or modules, also referring to the pre-departure sequencer module shown in FIG. 2, as well as the flow diagram of FIG. 3.

Figure 1:
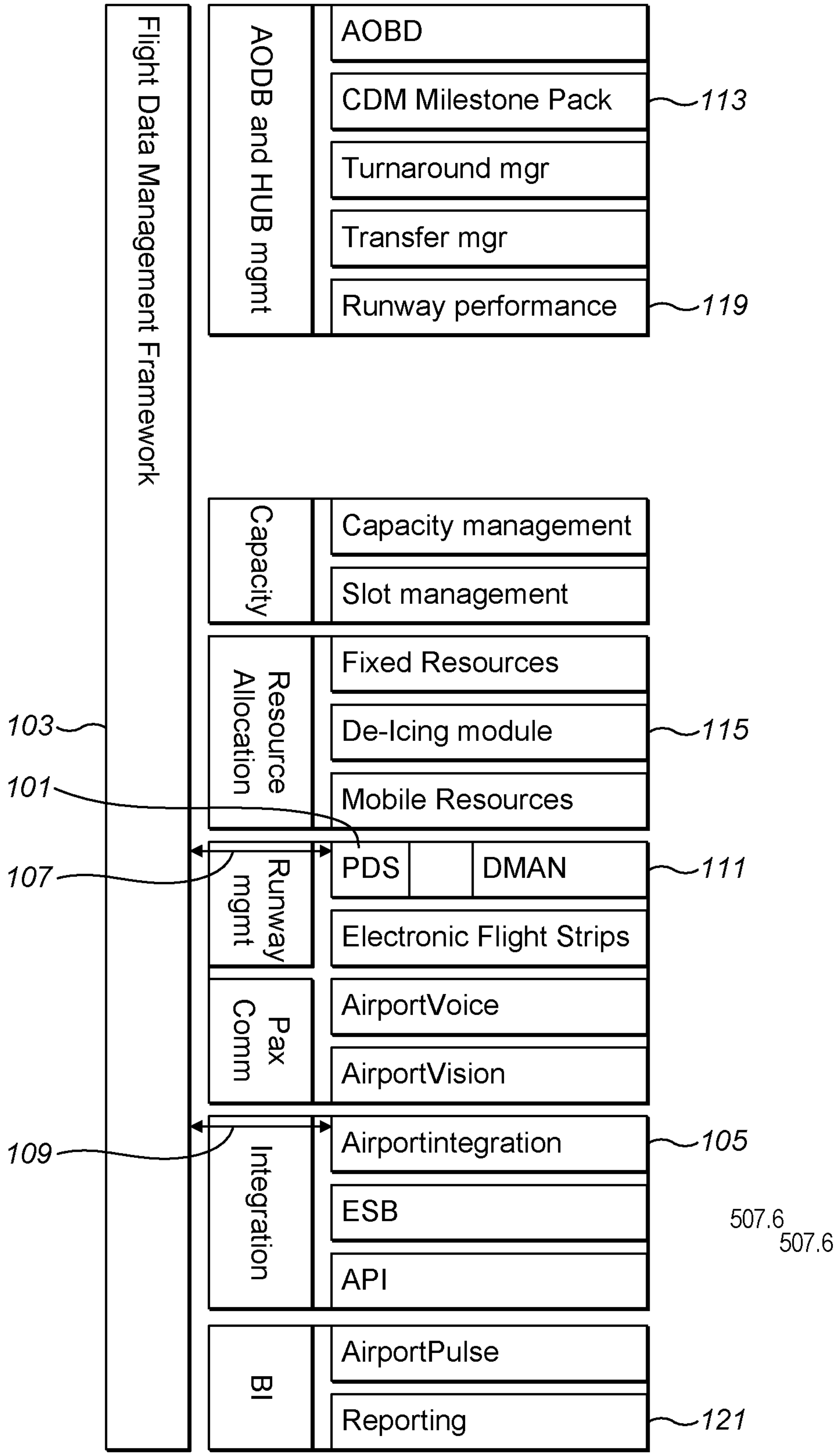
FIG. 1 is a schematic diagram of the main functional components embodying an aspect of the invention.
Figure 2:
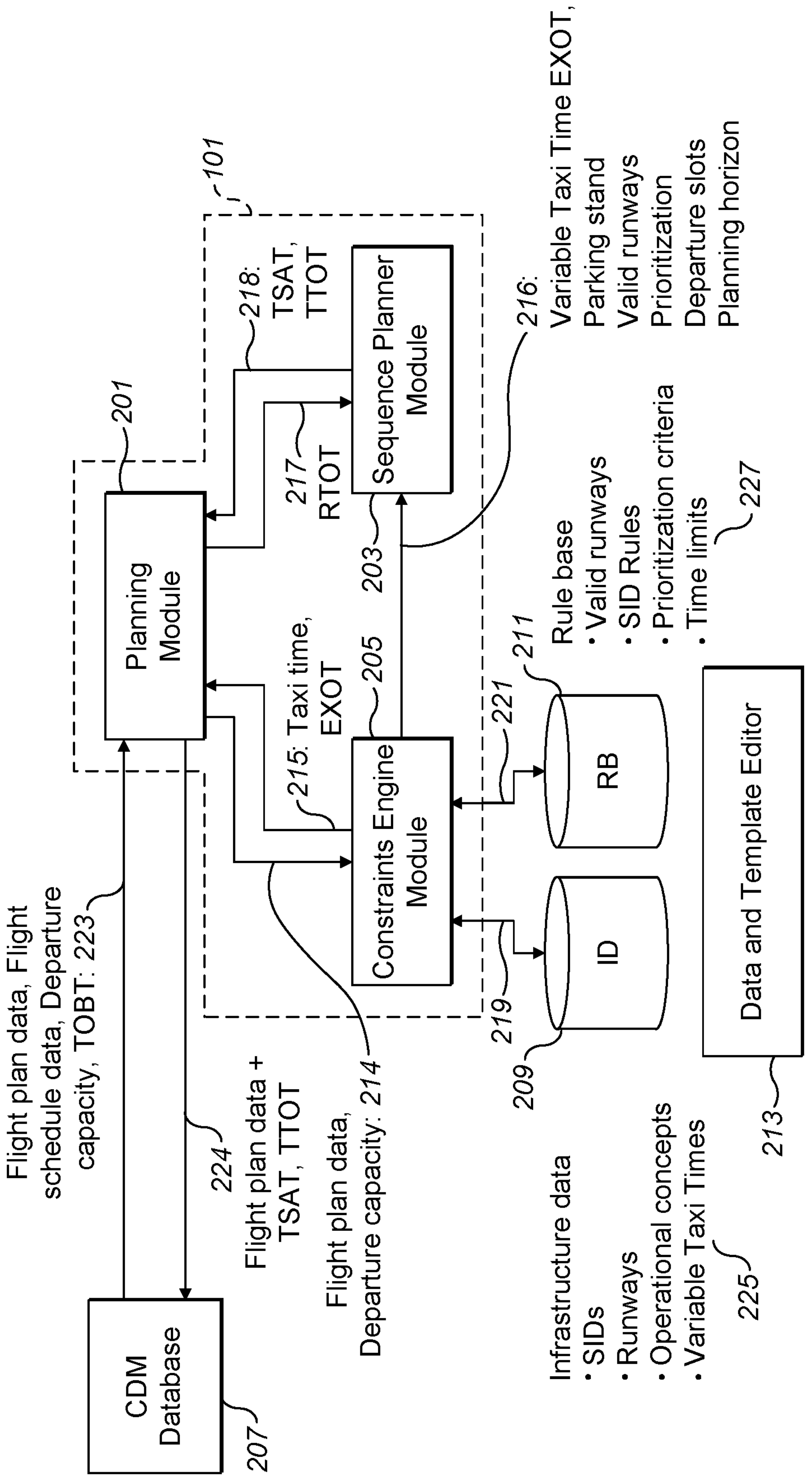
FIG. 2 is a schematic diagram of the main functional components of a pre-departure sequence module.
Figure 3:
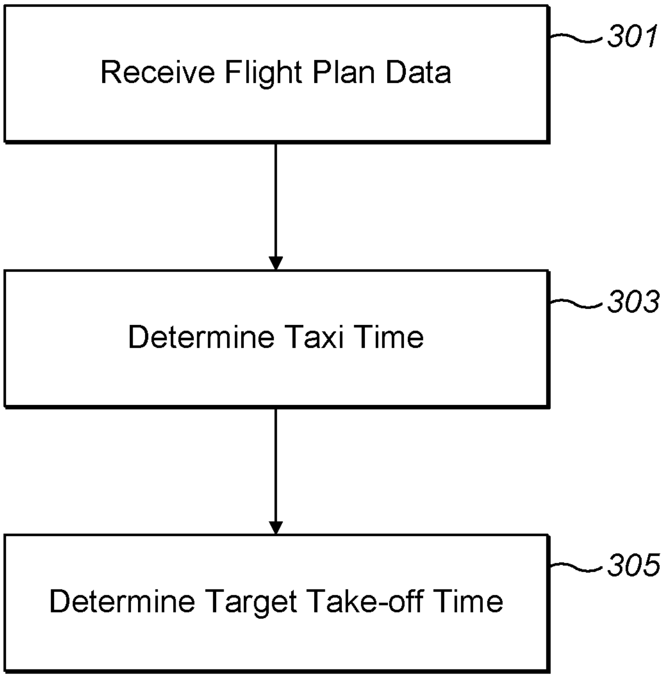
FIG. 3 is a flow diagram showing the main steps performed by an embodiment of the invention.

However, from the following description, it will be clear that it is not necessary for embodiments of the invention to include all of the modules shown in FIG. 1 or functional components shown in FIG. 2. Rather embodiments of the invention may however reside in a single functional component.

Usually, the messaging or communication between the different functional components in these figures is performed using the XML data format and programing language. However, this is merely exemplary, and other programming languages or data formats may be used, such as REST\JSON API calls. These may be communicated over HTTPS using wired or wireless communications protocols which will be known to the skilled person.

Usually, each of the different functional components shown in FIG. 1 may communicate with each other, using wired or wireless communication protocols which will be known to the skilled person. The protocols may transmit service calls, and hence data or information between these components. Data within the calls is usually in the form of an alpha-numeric string which is communicated using wired or wireless communication protocols as previously described.

The system may comprise any one or more of a pre-departure sequence (PDS) module, 101, which is communicatively coupled to a data management framework 103. The framework 103 provides an interface by which each of the modules shown in FIG. 1 may communicate with each other and exchange information or messages. For example, an airport integrator module 105 may also be communicatively coupled to the framework 103.

In all cases, wired or wireless communications protocols 107, 109 may be used to exchange information between each of the functional components.

The airport management or departure sequencing system shown in FIG. 1 may further comprise any one or more of the additional modules shown in FIG. 1, such as a DMAN module 111 for the planning of an optimal take-off sequence under consideration of Air Traffic Control (ATC) constraints, a monitor module also referred to as a CDM milestone pack 113, a de-icing module 115, a runway performance module 119, and a reporting module 121.

Each of the modules may run on a separate computer processor or server, although it will be appreciated that embodiments of the invention may in principle run on a single computer or server. Usually, a wired or wireless communications network is used. This may communicatively couple one or more of the functional components shown in FIG. 1 together to allow data exchange between the component(s).

Pre-Departure Sequence (PDS) Module 101

Firstly, the functionality of the Pre-Departure Sequence (PDS) module 101 will be described with reference to FIG. 1 of the drawings, referring also to the detailed functional component diagram of FIG. 2.

From FIG. 2 of the drawings, it will be appreciated that the Pre-Departure Sequence module 101 may comprise any one or more of the following modules:

- A planning module, 201: The planning module includes the functionality which determines how to handle received flight plan data.
- A sequence planner module 203: The sequence planner module determines or calculates the off-block sequence and the respective times such as the target take off time (TTOT) or/and target start-up approval time (TSAT).
- A constraint engine module 205: The constraint engine adjusts flight plans in accordance with defined constraints or rules and infrastructure data. For the configuration of the constraint engine, and thus the Pre-Departure Sequence (PDS) module 101, a Data and Template Editor may be used.

The following description focuses on the functionality of the Pre-Departure Sequencer module 101. Usually, the input to the Pre-Departure Sequence (PDS) module 101 comprise any one or more of flight plan data, flight schedule data, and a target off-block time, referred to as a TOBT, and optionally a calculated take-off time (CTOT) for each flight in the sequence.

The calculated take-off time (CTOT) for each flight may be determined by an external system. The calculated take-off time (CTOT) is usually a take-off time which is determined for a particular flight such that when the flight or aircraft arrives at its destination airport, the destination airport has sufficient resources or runways to handle all of the different flights arriving from different origins. In addition, the calculated take-off time (CTOT) may be influenced by an airspace saturation of an area the flight must cross. However, in all cases, the calculated take-off time (CTOT) may be thought of as a constraint for take-off at the origin airport.

It should be noted that a calculated take-off time (CTOT) is not essential to allow the Pre-Departure Sequence (PDS) module 101 to determine an optimised sequence which may be defined by a target take-off time (TTOT) and a target start-up approval time (TSAT). However, the calculated take-off time (CTOT) may be a potential constraint for planning.

The target off-block time (TOBT) is usually the time at which the handling process of an individual flight or departure is finished and it is ready to push off the block. It should be noted that the target off-block time (TOBT) is the time this individual flight may push off the block. This time does not consider any other traffic or constraints but which is considered in the target start-up approval time (TSAT).

The output from the Pre-Departure Sequence (PDS) module 101 may comprise an optimised sequence of resources, flights or off-block sequence. The sequence may be defined by a target start-up approval time (TSAT) for each flight and a target take-off time (TTOT) for each flight.

The target start-up approval time (TSAT) usually comprises data defining the determined time at which a pilot receives clearance to start the aircraft engines.

The target take-off time (TTOT) is usually the determined time at which an aircraft is scheduled for take-off.

Data defining a Variable Taxi Time (EXOT) for each flight may be determined. A number of factors may be used to determine the Variable Taxi Time (EXOT) for each flight. For example, the variable taxi time may be determined based on aircraft type, weather conditions, distance between the runway and stand, and so on.

Data defining a requested take-off time (RTOT) may be determined. As described in further detail below, usually, the requested take off time (RTOT) is a parameter which is updated and may vary based on the variable taxi time (EXOT) and the target-off block time (TOBT).

Date defining a scheduled off-block time (SOBT) may be determined. The scheduled off-block time (SOBT) is the time published in the flight schedule which a passenger may see when booking a flight. Usually the scheduled off-block time is stored in a CDM database 207 and sent as part of the data 223 shown in FIG. 2.

It will be appreciated that any of the times or data referred to may be defined by key value pairs. Each time is usually defined by numerical values according to the 24 hour clock.

As shown in FIG. 2, data is received by the planning module from an external system such as a Collaborative Decision Making (CDM) database 207 via wired or wireless communications protocols which will be known to the skilled person.

The Pre-Departure Sequence (PDS) module 101 may be included in an Airport Management Solution (AMS) server, not shown in FIG. 2 of the drawings. The AMS server allows an API to communicate with external systems allowing two-way data exchange. The AMS Integration API supports operations on the flights, flight schedules, base data entities, such as resources, aircrafts, airports and so on.

The AMS Integration API may be provided by a web service that is hosted under a namespace or URL.

In one specific example, an integration module 105 is provided which runs an AMS Integration API or module 105.

The API may be built on a pre-defined XML data format and may be accessed in two ways:

Asynchronous message-based requests and notifications

Synchronous SOAP Web Service calls

The asynchronous data exchange may be advantageously used to notify API users of any changes to a departure sequence. This is referred to as an event-driven synchronization model. Asynchronous data exchange may also be advantageous used when the volume of incoming updates to AMS is high and there is no need to confirm each and every request sent to AMS.

The asynchronous communication is based on message queue infrastructures, and currently AMS supports MS MQ and IBM WebSphere queues.

Synchronous communication may advantageously be used for embodiments of the invention which are able to retrieve full state information or when an incoming call to the AMS must be blocked for an external system until a previous request or action has been completed. The synchronous API may be implemented as SOAP web-service using HTTP as transport protocol.

Some embodiments of the invention may advantageously combine these two synchronization models when integrating AMS with external systems in such way that the synchronous part is used for the initial state load and afterwards the external system is updated by notifications received on a message queue.

The data structures used for communication, both incoming (requests) and outgoing (notifications and responses), usually have the same data types, defined in an XSD schema or a WSDL file.

Data Types

In one specific embodiment, the AMS native API uses XML messages for passing information to and from the system. In general there may be two different types of XML messages:

1. Operational messages
2. Seasonal messages

Operational messages involve a single flight whereas the Seasonal messages contain a seasonal schedule information and thereby involve multiple flights.

Properties in AMS

Each entity or module shown in FIGS. 1 and 2 of embodying the system may comprise one or more properties. These properties may be used to interact with the system using the API. For some of the properties the field is defined in the system. These include:

ScheduleDate

Route

Aircraft

AircraftType

Other properties are system specific and are defined in the AMS settings as Custom Fields and Custom Tables. As part of these settings a unique External Reference may be defined which is used when referencing an attribute in a message.

Flight Identifier Element

For operational messages, the Flight Id may be used to identify a flight uniquely. Thus, a unique key may be defined, comprising one or more properties. It may be used in most flight-specific messages. In one specific example, the FlightId properties are shown in Table 1:

TABLE 1

Properties of the Operational FlightId element

| Name | Datatype | Attributes | Description |
|---|---|---|---|
| FlightKind | FlightKind enumeration | — | The type of flight, allowed values are “Arrival” and “Departure” |
| AirlineDesignator | string | codeContext | The IATA or ICAO code for airline identification code, corresponding to the supplied codeContext. Multiple AirlineDesignator values are possible, using different codeContexts. |
| FlightNumber | string | — | The Flight Number, a number consisting of 1 to 4 digits that together with the airline designator makes up the flight code for the flight. |
| ScheduledDate | Date | — | The scheduled date of arrival/departure for the flight, formatted in the standard XML Date format(YYYY-MM-DD). |
| AirportCode | String | codeContext | The IATA or ICAO code for the airport the flight is arriving to or departing from, corresponding to the supplied codeContext. Multiple AirportCode values are possible, using different codeContexts. |

An exemplary Flight Id XML message is shown in table 2.

TABLE 2

An exemplary Flight Id XML message.

```
1 <FlightId>
2   <FlightKind>Arrival</FligthtKind>
3   <AirlineDesignator codeContext=“IATA”>SK</AirlineDesignator>
4   <FlightNumber>2343A</FlightNumber>
5   <ScheduledDate>2012-01-13</ScheduledDate>
6   <AirportCode codeContext=“IATA”>CPH</AirportCode>
7 </FlightId>
```

Thus, it will be appreciated that the data which is communicated between any of the different functional components shown in FIGS. 1 and 2 of the drawings, such as flight plan data and flight schedule data, may be communicated between any of the functional components shown in FIGS. 1 and 2 of the drawings using operational or seasonal messages described above.

Other properties are system specific and are defined in the AMS settings as Custom Fields and Custom Tables. As part of these settings a unique External Reference may be set, that is used when referencing the attribute in a message.

A Calculated Take-Off Time (CTOT) for each flight may be determined by an external system. The Calculated Take-Off Time (CTOT) is usually a take-off time which is determined for a particular flight such that when the flight or aircraft arrives at its destination airport, the destination airport has sufficient resources or runways to handle all of the different flights arriving from different origins. This helps reduce the amount of time an aircraft has to spend in a holding pattern.

Accordingly, the Calculated Take-Off Time (CTOT) may be determined based on the distance between the origin and destination, aircraft type, aircraft speed, flight plan data, weather data and so on. For example, if the aircraft is an Airbus A380 with a cruising speed of approximately 900 km/h, and the distance between the origin and destination is 5000 km, then the flight time may be calculated as approximately 5 hours 30 minutes. If the flight is scheduled to arrive at the destination 21:30 hours, and there is sufficient capacity at the arrival airport to accommodate the flight, the Calculated Take-Off Time (CTOT) may be determined as 16:00 hours.

As noted above, the Calculated Take-Off Time (CTOT) may be influenced by an airspace saturation of an area the flight must cross. However, in all cases, the Calculated Take-Off Time (CTOT) may be thought of as a constraint for take-off at the origin airport.

In addition, the Calculated Take-Off Time (CTOT) is determined as a reference time for a time window. For example in Europe, the time window is defined as −5'<CTOT<10'. A flight must take off within this time window which is referred to as an Air Traffic Control (ATC) slot.

For the sake of simplicity unless indicated otherwise, all dates and timestamps are described without information about a time zone or Coordinated Universal Time (UTC) offset.

Usually, the dates, times and day of operation patterns (DOOP) do not specify time zones when API messages are sent to the system or when an external system is making a web service call. The values of date and time properties submitted to the system usually have the same meaning as the values set throughout the different client user interface applications.

Usually, the Target Off-Block Time (TOBT) is set by the ground handler. The Target Off-Block Time (TOBT) is usually determined based on the expected end of the turnaround process which may include the processes of deboarding, baggage off-loading, cleaning, fuelling, and so on.

The output from the Pre-Departure Sequence (PDS) module 101 comprises optimised or sequenced ordering of resources or flights which defines an optimised-off block sequence for each flight or aircraft. The sequence may be defined in one specific example by a Target Start-up Approval Time (TSAT) or/and a target take off time (TTOT) for each flight or aircraft.

Based on a rule set 227 the Pre-Departure Sequence (PDS) module 101 generates a departure sequence which may be defined by any one or more of a Target Start-up Approval Time (TSAT) from the parking stand and target take-off time from the runway (TTOT) for each flight or aircraft.

For example, the rule set 227 may define any one or more of valid runways associated with a particular flight or aircraft type, Standard Instrument Departure (SID) rules defining a climb gradient for the aircraft after take-off, or data defining how one particular flight or departure may be prioritised over another a time limit, as shown in FIG. 2 of the drawings.

The sequence of flights or ordering of resources may be continuously monitored and updated to ensure that constraints are taken into account by way of feedback from one or more of the modules shown in FIGS. 1 and 2 of the drawings to the Pre-Departure Sequence (PDS) module 101.

Thus, it will be appreciated that the constraints which are used by the Pre-Departure Sequence (PDS) module 101 or the constraints engine (205) to determine the departure sequence usually comprise any one or more of:

- Flight plan data 223 for each flight. For example the flight plan data may comprise a target off-block time, TOBT, and a calculated take off time, CTOT, a take-off runway, a call sign, and aircraft type, an aircraft registration, different time stamps, as well as estimates and actual times for each of the different time stamps. Usually, the flight plan data comprises or includes flight schedule data for each flight, such as data that defines that there is a specific flight from an origin to a destination at a particular time and on a particular date. In one specific example, the flight schedule data may comprise alpha-numeric data that defines that there is a flight from an origin airport such as Hannover Airport (HAJ) to a destination airport such as London Stanstead (STN) at 18:10 on 9 Nov. 2018 which is scheduled to arrive at 18:40. The flight plan data may be received from a CDM database by wired or wireless communications protocols which will be known to the skilled person;
- Airport specific data such as infrastructure data 225. For example the data may comprise the number of runways, average taxi time between different stands and different runways;
- Various parameters for the configuration of the system (e.g. buffer times).

In some examples, in addition to the flight plan data, additional data may be provided to Pre-Departure Sequence (PDS) module 101. This additional data may define the departure capacity that defines how many flights per hour can be handled at the runway.

As will be explained in further detail below, the Pre-Departure Sequence (PDS) module 101 uses the infrastructure data 225 such as parking stands and runways and the variable taxi time between the departure gate and the take-off runway, the departure capacity (for example a departure capacity may be 40 or 20 flights per hour) and the Target Off-Block Time and the rules 227 to determine or calculate the Target Take-off Time (TTOT) for each flight, and Target Start-up Approval Time (TSAT) for each flight in the sequence.

In some embodiments, the Pre-Departure Sequence (PDS) module 101 may be configured as a proposal system for the tower controller. This has the advantage that the controller can deviate from the planning results at any time by using manual modifications of the sequence or by fixing flights at specific times.

In this case, an update according to the modified constraints may be determined. In other embodiments, the departure sequence of a plurality of aircraft is controlled by the Target Take-Off Time (TTOT) and Target Start-up Approval Time (TSAT) determined by the Pre-Departure Sequence (PDS) module 101 for each aircraft or flight.

A data and template editor (DTE) 213 may be provided. This allows operators or users of the system to adapt the infrastructure data 225 and the rule set 227 so that the Pre-Departure Sequence (PDS) module 101 can be adjusted to changing conditions.

The following description focuses on the main functionality each of the planning module 201, sequence planner module 203, and constraints engine module 205 which may form part of the Pre-Departure Sequence (PDS) module 101 according to the specific embodiment shown in FIG. 2 of the drawings.

In this embodiment, the data input 223 into the planning module 201 comprises flight plan data including flight schedule data, the target off-block time (TOBT) and departure capacity for each flight. As shown in the flow diagram of FIG. 3, flight plan data is received at step 301.

The data output 224 from the planning module 201 comprises flight plan data with additional data or in other words, flight plan data which has been augmented by including or associating a determined target start-up approval time (TSAT) or/and a determined Target Take-Off Time (TTOT) with the flight plan data for each flight. This may be determined based on the interaction of modules 201, 203, 205, which will be explained in further detail below.

The output 214 from planning module 201 into the constraints engine module 205 comprises flight plan data and departure runway capacity data. Usually, the data output 214 from the planning module 201 comprises a subset of the data 223 received by the planning module. Usually the data is passed on as a data pass-through without modification.

The data received by constraints engine module 205 allows the constraints engine module 205 to determine a variable taxi time (EXOT) for each flight. One specific example of how the constraints engine module 205 determines the variable taxi time (EXOT) for each flight based on the received flight plan data and other data will be described in further detail below. At step 303, a taxi time such as a variable taxi time (EXOT) is determined.

The input 215 to planning module 201 received from the constraints engine module 205 comprises data defining a variable taxi time (EXOT) for each flight. Thus, the variable taxi time (EXOT) determined by the constraints engine module 205 is communicated to the planning module 201.

The variable taxi time (EXOT) 215 for each flight received by the planning module 201 from the constraints engine module 205 allows the planning module 201 to determine a requested take of time for each flight (RTOT).

One specific example of how the planning module 201 determines a requested take of time for each flight (RTOT) based on variable taxi time (EXOT) for each flight and other received data will be described in further detail below. For example, the planning module 201 may determine the requested take off time (RTOT) for each flight based on the sum of a target off-block time (TOBT) plus a variable taxi time 217 (EXOT) for each flight.

The output 217 from planning module 201 comprises data defining the requested take off time (RTOT) for each flight.

One specific example of how the sequence planning module 203 determines the target start up time (TSAT) and Target Take-Off Time (TTOT) based on the requested take of time for each flight (RTOT) and other data will be described in further detail below.

Once the sequence planning module 203 has determined the target start up time (TSAT) or/and Target Take-Off Time (TTOT) for each flight at step 305, this data 218, or in other words the target start-up approval time (TSAT) for each flight or/and the Target Take-Off Time (TTOT) for each flight is communicated to the planning module 201.

Thus, the input 218 to the planning module 201 received from the sequence planner module 203 comprises data defining the Target Take-Off Time (TTOT) for each flight and usually the target start-up time (TSAT) for each flight.

The constraints engine usually outputs 216 further data to the sequence planner module 203. The further data input 216 into the sequence planner module 203 usually comprises any one or more of data defining a variable taxi time (EXOT), data defining an aircraft parking stand, data defining a valid runway associated with a flight or aircraft, data defining a prioritization for each flight, data defining a number of departure slots, or data defining planning horizon (for example, 1 hour). Some of this data is shown in FIG. 2 of the drawings.

Planning Module 201

In the embodiment shown in FIG. 2, a planning module 201 is provided. As outlined above, the module 201 receives data 223 comprising flight plan data, flight schedule data, and usually a target off-block time (TOBT) and departure capacity data. The data may be communicated by way of XML messages as outlined above.

The planning module 201 is configured to determine a requested take-off time (RTOT) or in other words a reference take-off time for each flight in the sequence of flights based on one or more of the following data elements:

- target off-block time (TOBT) or scheduled off-block time (SOBT);
- The planned runway which may depend on the Standard Instrument Departure (SID) Route;
- The variable taxi time (EXOT). This may be dependent upon the stand and runway.
- The de-icing time depending on aircraft size and de-icing situation. This may affect the variable taxi time (EXOT) if off stand de-icing facilities are provided at a particular airport.

As previously described, the scheduled off-block time (SOBT) is the time published in the flight schedule which a passenger may see when booking a flight.

In one specific example, the requested take off-time (RTOT) may be determined according to equation 1:

$$RTOT=TOBT+EXOT \quad \text{Equation 1}$$

As explained in further detail below, table 4 below shows a specific example of a sequence of flights defined by a number of different parameters, such as the requested take-off time (RTOT), the target off-block time (TOBT), and the variable taxi time (EXOT).

The target off-block time (TOBT) may be thought of as an update to the scheduled off-block time (SOBT) considering the actual ground handling state. Thus, it will be appreciated that the scheduled off-block time (SOBT) is static, while the target off-block time (TOBT) may be dynamically updated and therefore different to the scheduled off-block time SOBT.

The requested take-off time (RTOT) determined by the planning module 201 is then output or sent 217 to the Sequence Planning Module 203 via wired or wireless communication means 217, using for example an XML message.

As will be explained in detail below, the sequence planning module 203 uses the determined requested take-off time (RTOT) as the basis for the sequence planning.

Constraint Engine Module 205

The constraint engine module is usually configured to generate constraints for the calculation in the sequence planner module 203, rather than to calculate the sequence itself.

One example is the calculation of 'departure slots'. For example, it the runway capacity is 20 departures/hour and the slot starts at 10:00, then the potential take-off slots with an assigned target take off time (TTOT) are 10:00, 10:03, 10:06, etc. The sequence planning module 203 may then assign a flight or aircraft to each take off slot or target take-off time (TTOT).

The constraint engine module 205 processes the basic data received with a flight plan to allow the sequence planning module 203 to calculate the target take-off time (TTOT) and target start-up approval (TSAT). The determined target take off time (TTOT) and target start-up approval time (TSAT) may augment the received flight plan data on the basis of reference data, constraints and defined rules.

This data includes:

- allocation to runway based on the Standard Instrument Departure (SID) rules and valid operational concept (if not set by other systems)
- calculation of the Standard Instrument Departure (SID) based on departure fix, e.g. if a runway is changed (if not set by other systems)
- calculation of taxi time based on defined taxi time table
- setting of priority based on defined rules, e.g. an ambulance flight or head of state flight Furthermore, the constraint engine module 205 may determine the interval capacity resulting from departure capacity and interval size.

Sequence Planning Module 203

Further explanation of how the sequence planning module 203 uses the received requested take off time (RTOT) for each flight and the data 216 shown in FIG. 2 to determine an initial sequence for each flight is provided below.

As will be explained below, the determined target take-off time (TTOT) for each flight may be used to determine the target start-up approval time (TSAT) for each flight.

Further, the target start-up approval time (TSAT) may be determined or calculated under consideration of the taxi time between the runway and each parking stand.

As previously explained, the sequence planning module 203 receives the requested take off time (RTOT) determined by module 201 as outlined above for each flight in the sequence of flights.

The sequence planner module 203 determines a target take-off time (TOT) for each flight in the sequence of flights subject to a quantitative allocation of departures to time intervals based on the received RTOTs.

Further, the sequence planner module (203) receives constraint data 216 for the sequence planning from the constraints engine module 205 via 216.

As previously outlined, the constraint data 216 received by communication 216 may comprise data defining a planning horizon, potential take-off slots according to the runway capacity and priorities for specific flights like 'Head of State' or 'Ambulance'.

In one example, a planning horizon for a pre-departure sequence may be defined as a 60 minutes interval. In one specific example, the sequence planning module may exclude all flights with a requested take off time (RTOT) later than the current time plus 60 minutes excluded from the planning algorithm.

Sequence planning is achieved by allocating each departure or flight to one of the departure slot data received from the constraints engine module 205 in communication 216. The output from the sequence planning module 203 is therefore data defining a sequence of flights for take-off.

Thus, the sequence output from the sequence planner is determined based on the input requested take-off time (RTOT) received by the sequence planning module 203 and the departure slots.

Specific Example of a Sequence of Flights

According to one specific example, a sequence of flights may be defined according to table 3:

TABLE 3

An exemplary sequence of flights determined according to an embodiment of the invention.

| Sequence | Flight | TOBT | EXOT | RTOT | Constraint | TTOT | TSAT |
|---|---|---|---|---|---|---|---|
| 5. | LH110 | 10:00 | 0:09 | 10:09 | | 10:16 | 10:07 |
| 4. | AF320 | 10:00 | 0:07 | 10:07 | CTOT: 10:18 | 10:14 | 10:07 |
| 1. | BA435 | 10:00 | 0:07 | 10:07 | | 10:08 | 10:01 |
| 3. | LH397 | 10:00 | 0:08 | 10:08 | | 10:12 | 10:04 |
| 2. | AF776 | 10:00 | 0:09 | 10:09 | Head of state | 10:10 | 10:01 |

This example assumes that the defined runway capacity of the airport is 30 departures per hour, so that available take-off slots are: . . . , 10:06, 10:08, 10:10, 10:12, 10:14, 10:16, 10:18, 10:20, 10:22, 10:24 and so on. Thus, in this example, there is a 2 minute interval between take-off slots.

It will be appreciated that without the Pre-Departure Sequence (PDS) module 101 according to embodiments of the invention, all pilots will request off-block to the control tower at 10:00 because all of the above flights have the same target off-block time (TOBT).

As the sequence of pilot requests is largely a random process, the pilot of AF320 might be the first aircraft to request off-block and thus obtain the off-block clearance immediately.

As this flight has the joint shortest taxi time (EXOT) it will also be the first aircraft to arrive at the runway. However, a constraint associated with this flight is that it has a calculated take-off time (CTOT) of 10:18. This means that the earliest take-off time for this flight is 10:13 because usually aircraft are only permitted to take off a predetermined amount of time (e.g. 5 minutes) in advance of any calculated take-off time (CTOT) because otherwise an aircraft might have to be held in a holding pattern at the arrival airport.

This means that flight AF320 has to wait 6 minutes with its engines running at the runway.

The following description assumes that all the other flights listed in the table above will also arrive at the runway at their requested take-off time (RTOT). This means that flight BA435 will take-off first without any delay.

However, this means that flights LH110 and LH397 will be delayed as flight AF776 is associated with the constraint 'Head of State' on board is also approaching the runway. Because the control tower always gives priority to so-called "state flights", AF776 will be the next flight to receive take off clearance from the control tower. Therefore, in the above example, the Actual Take-Off Time (ATOT) for AF776 is 10:09, LH397 is 10:11 and LH110 is 10:13 or even 10:15 if flight AF320 takes-off first.

However, embodiments of the invention allow for the sequence to be planned so that flight LH110 avoids 4 minutes with engines running and burning fuel. This may be achieved if the pre-departure sequence 101 system determines the sequence of aircraft or flights so that flights are assigned an off-block time according to their associated target start-up approval time (TSAT).

Thus, with the pre-departure sequencing system (101) according to embodiments of the invention, the sequence planning performed under consideration of the constraint data 216 provided by the constraint engine 205 to the sequence planning module 203 based on the rules.

For example:

Flight AF776 has a constraint indicating that the flight has a Head of State on board has highest priority compared to all other flights the above example.

The rules specify that flights which have an associated calculated take-off time (CTOT) may not be planned before their slot start. In this example, flight AF320 may not be placed in a sequence before its slot begins or starts. In this example, flight AF320 may not be planned before 10:13. However, compared to the remaining other flights it has priority due to the calculated take off time (CTOT) constraint.

Therefore, according to embodiments of the invention, the sequence is planned or scheduled as follows:

Both flights BA435 and LH397 apply for the 10:08 slot. This is because these 2 flights have the earliest associated requested take off times, RTOT's in the table. As BA435 has an earlier RTOT, the sequence planning module 203 assigns or associates flight BA435 to the 10:08 slot based on a priority rule that defines how if 2 flights apply for the same slot, that the slot assigned to or associated with the flight having an earlier requested take-off time (RTOT). This means that flight LH397 must apply for the 10:10 slot.

This means that LH397, LH110 and AF776 all apply for the 10:10 slot. As AF776 is a state flight it has priority. Therefore flight AF776 is assigned to the 10:10 slot or in other words associated with the 10:10 slot. This means that flights LH 397 and LH110 are delayed and must apply for the 10:12 slot.

LH397 and LH110 therefore apply for the 10:12 slot. As LH397 has the earlier requested take-off time (RTOT) it is assigned to the 10:12 slot. Once again the sequence planning module 203 assigns this flight to the slot based on the priority rule. This means that flight LH110 must apply for the 10:14 slot.

LH110 and AF320 then apply for the 10:14 slot. As AF320 has an associated calculated take-off time (CTOT) constraint, the planning module determines that this flight has priority and assigns or associates flight AF320 with the 10:14 slot. The sequence planning module 203 finally associates flight LH110 with the final 5$^{th}$ slot shown in the table.

From the foregoing, it will be appreciated that some flights must be delayed as not all flights can take off at the same time. However, the sequence defined according to embodiments of the invention may allow delayed flights to remain at their parking stand with engines off until they are accommodated into the departure sequence.

This saves fuel and reduces emissions because a target start-up approval time (TSAT) for each aircraft in the sequence may be determined based on the sequence which may be defined according to the determined target take-off time (TTOT) and the associated variable taxi time (EXOT).

In one specific example, the target start-up approval time (TSAT) may be determined based on the difference between the target take-off time (TTOT) and the variable taxi time (EXOT). This may be according to equation 2 below:

$$TSAT = TTOT - EXOT \quad \text{Equation 2}$$

Thus, it will be appreciated that the sequence of flights may be defined for each flight by, or associated with a flight identifier, a target take-off time (TTOT). Optionally, the sequence may be defined by a target start-up approval time (TSAT), a variable taxi time (EXOT), a TOBT, and, a requested take off time (RTOT) and by one or more constraints.

Thus, it will be appreciated that embodiments of the invention may determine the sequence of flights or in other words the target take-off time (TTOT) for each flight based on the requested take off time (RTOT) for each flight, and one or more constraints such as a calculated take off time (CTOT) or/and a constraint. For example, the constraint may be data defining a flight priority relative to other flights in the sequence. The higher priority may be associated with flights having a head of state on board or a flight having a passenger requiring emergency medical treatment. Lower priority may be assigned to flights not having a head of state on board or a passenger requiring emergency medical treatment.

However, other additional parameters may be associated with each flight. For example, each flight in the sequence may also be associated with any one or more of data defining:

A Unique flight identifier

A Departure Call Sign

Flight Status

IATA aircraft category

An Aircraft type

The associated Ground Handler

The stand

The gate

The destination

The schedule off-block time (SOBT)

The estimated off-block time (EOBT)

The sequence planning module (203) may be further configured to optimise a sequence of aircraft based on minimising a temporal separation between sequential aircraft. This may be determined based on an aircraft size, a departure route, different speed classes for each aircraft. The minimum temporal separation between sequential aircraft may be selected based on whether the first aircraft in the sequence of aircraft is the same type or size as the second aircraft in the sequence of aircraft and wherein the separation is defined by the size of the aircraft.

This has the advantage that the sequence or order of aircraft may be maintained even if 2 aircraft have the same origin and destination. This avoids one aircraft passing or overtaking another aircraft.

As the sequence planning module 203 is a separate module, it may be replaced by a different module which uses a different optimizer. For example, a module which optimizes the departure sequence by minimizing a separation between sequential flights in the sequence may be provided. This may be referred to as a DMAN or a departure manager module 111.

De-Icing Module 115

In case of de-icing, an extended taxi time may be determined by the constraints engine module 205 based on data received from a de-icing module 115. The planning module 201 may be configured to receive such a data update and changing constraints. Thus, the constraints engine module 205 may be configured to check freeze states and reset such states if necessary.

Thus, is will be appreciated that the planning module 201 may be configured to determine an updated requested take off time (RTOT) for each flight in the sequence of flights based on feedback received from one or more other modules shown in FIG. 1 or FIG. 2 of the drawings.

For example, re-planning may be event-driven initiated, due to single or multiple events for a flight plan or due to general modifications like change of the taxi time factor. Dependent on how the data has changed, a new RTOT for the single flight is calculated or the RTOT for all flights are verified.

One specific example of how a specific event may affect the requested take-off time (RTOT) for each of the flights in the sequence is a general change of variable taxi times (EXOT) e.g. due to fog. This may have an impact all flights in the sequence. For example, heavy fog may mean that the variable taxi times for each flight shown in table 3 have to be increased by a predetermined amount, such as by 5 minutes'.

The planning module 201 may also be configured to perform re-planning. An updated sequence of flights may be determined based on a received event message.

For example, the event message may indicate that an aircraft is not ready at the determined target start-up approval time (TSAT) or a definable time after target start-up approval time (TSAT) if no Actual Off Block Time was received by the system 101. For example the requested take of time (RTOT) or more usually the target take off time (TTOT) may be deleted from the sequence of flights if a particular aircraft is not ready at target start-up approval time plus a predetermined period of time, such as 5 minutes. This event usually triggers re-planning to fill the gap.

Thus, it will be appreciated that de-icing may be on stand, that the pre-departure sequence system (101) may optimise the use of de-icing trucks. For both on-stand and remote de-icing, a time to perform the de-icing operation may be determined. The de-icing time may be determined based on an aircraft type and conditions. Based on this information, and optimal sequence for either on or off stand de-icing may be determined which minimises delay and maximises throughput. Usually, the time determined for remote de-icing is shorter than the determined time for on-stand de-icing.

The de-icing module (115) is usually coupled to the sequence planning module (203). This may be by way of bi-directional data exchange between the module (115) and the module (103). This allows the system 101 to calculate a sequence with realistic constraints. It also provides feedback to the system 101 so that a more accurate sequence may be determined.

Runway Performance Module (119)

A runway performance module (119) may be provided. The module (119) may be communicatively coupled to the third module (203). T further module (119) is usually configured to determine an actual arrival and departure capacity of an airport. The capacity may be determined based on any one or more of data defining weather conditions and traffic demand. Usually, the further module (119) is configured to provide unidirectional or one-way data exchange between the third module (203) and the further module (119).

AMS Web Application

An AMS web application or user interface may be coupled to the pre-departure sequencing system 101. This allows third parties to inspect the flight plan data and associated additional information such as the determined target start up time (TSAT) or target take-off time (TTOT) or any of the other parameters or data associated with a flight such as data defining:

A Unique flight identifier
A Departure Call Sign
Flight Status
IATA aircraft category
An Aircraft type
The associated Ground Handler
The stand
The gate
The destination
The schedule off-block time (SOBT)
The estimated off-block time (EOBT)

This allows third parties to determine if a particular aircraft has or will occupy a particular stand or location for longer than expected.

Data Updates and Feedback

Embodiments of the invention may use a flight update request message to provide feedback from one or more modules shown in FIGS. 1 and 2 of the drawings. In one specific example, a FlightUpdateRequest is used for changing a flight in the system.

A FlightUpdateRequest may comprise:

- an identifier, that is used for identifying the flight which is to be updated; and
- a range of flight updates, that correspond to new values for the flight.

Possible flight updates include specific properties of the flight, table properties, custom fields, and specific properties of activities and events in the activityflow of the flight.

When a property does not have any update, it is not modified. If the value should be cleared, then an empty update element may be added to the flight updates. This applies to all flight properties, custom fields, activity properties, and event properties.

Like properties, table properties not specified are left untouched. To clear a table, the table may be specified without any rows.

When a FlightUpdateRequest is sent for a flight that is not already present in the system, the update request is ignored, and an integration alert is raised in AMS.

An example of a FlightUpdateRequest message is shown in table 4.

TABLE 4

An exemplary flight update request message.

```
<?xml version="1.0" encoding="utf-8" ?>
<amsx-messages:Envelope
  xmlns:amsx-messages="http://www.sita.aero/ams6-xml-api-messages"
  xmlns:amsx-datatypes="http://www.sita.aero/ams6-xml-api-datatypes"x
  xmlns:xsi="http://www.w3.org/2001/XMLSchema-instance"
  apiVersion="2.8">
  <amsx-messages:Content>
    <amsx-messages:FlightUpdateRequest>
      <amsx-datatypes:Token>TOKEN</amsx-datatypes:Token>
    <amsx-messages:FlightId>
      <amsx-datatypes:FlightKind>Arrival</amsx-datatypes:FlightKind>
      <amsx-datatypes:AirlineDesignator codeContext="IATA">SK</amsx-datatypes:AirlineDesignator>
      <amsx-datatypes:FlightNumber>2342A</amsx-datatypes:FlightNumber>
      <amsx-datatypes:ScheduledDate>2012-01-13</amsx-datatypes:ScheduledDate>
```

TABLE 4-continued

An exemplary flight update request message.

```
        <amsx-datatypes:AirportCode codeContext="IATA">CPH</amsx-
datatypes:AirportCode>
      </amsx-messages:FlightId>
      <amsx-messages:FlightUpdates>
        <amsx-messages:Update propertyName="AircraftTypeCode"
codeContext="ICAO">A320</amsx-messages:Update>
        <amsx-messages:Update propertyName="Route" codeContext="IATA">RIX,
RNN</amsx-messages:Update>
        <amsx-messages:Update propertyName="ETA">2012-01-13T12:32:00</amsx-
messages:update>
        <amsx-messages:ActivityUpdate code="DEBOARDING">
          <amsx-datatypes:Update propertyName="EstimatedStartTime">2013-07-
08T10:25:00</amsx-datatypes:Update>
          <amsx-datatypes:Update propertyName="EstimatedEndTime"></amsx-
datatypes:Update>
          <amsx-datatypes:Update propertyName="ActualStartTime">2013-07-
08T10:26:00</amsx-datatypes:Update>
          <amsx-datatypes:Update propertyName="ActualEndTime"></amsx-datatypes:Up-
date>
        </amsx-messages:ActivityUpdate>
        <amsx-messages:EventUpdate code="ONBLOCKS">
          <amsx-datatypes:Update propertyName="EstimatedTime">2013-07-
08T10:15:00</amsx-datatypes:Update>
          <amsx-datatypes:Update propertyName="ActualTime"></amsx-datatypes:Update>
        </amsx-messages:EventUpdate>
```

Table 5 shows properties that may be created and updated using the flight update request message.

TABLE 5

Exemplary properties that may be created and updated using the flight update request message.

| Name | Datatype | Attributes | Description |
|---|---|---|---|
| ScheduledTime | DateTime | — | The scheduled time of the flight. |
| AircraftTypeCode | String | codeContext | The IATA or ICAO code for aircraft type, corresponding to the supplied codeContext. |
| Route | String | codeContext | A list of IATA or ICAO airport codes defining the route of the flight, corresponding to the supplied codeContext. |
| (Custom Field) | — | — | Any custom field available for the flight (arrival or departure). |
| (Event) | — | code | Updates to one or more properties for an event given by the supplied code. Available properties: EstimatedTime ActualTime |
| (Activity) | — | code | Updates to one or more properties for an activity given by the supplied code. Available properties: EstimatedStartTime EstimatedEndTime ActualStartTime ActualEndTime |
| (Table Property) | | | Update to one or more table properties given by the supplied code. |
| (CodeShares) | — | — | Updates to one or more flight code shares. |

De-Icing Module 115

The De-icing module 115 supports airport operators and de-icing companies in a more reliable planning of de-icing situations and a more efficient use of de-icing capacities.

The de-icing module is configured to determined de-icing times for different aircraft. The different de-icing time for each aircraft may define its position in the sequence of flights, such as that shown in table 3.

For example, larger aircraft may require a longer de-icing time compared to a smaller aircraft, due to the physical area of aircraft which needs to be de-iced.

Further, de-icing may also be performed on-block or off-block at a dedicated de-icing stand. Off-block de-icing may Thus, the de-icing times for each aircraft determined by the module 115 is provided as an input to the Pre-Departure Sequence (PDS) module 101, and thus allows module 101 to determined accurate Target Take-off Time (TTOT) and Target Start-up Approval Time (TSAT).

The pre-departure sequence (PDS) system 101 may provide an input to the de-icing planning module 115.

For example, the pre-departure sequence system may determine an earliest de-icing start time based on the target off block time (TOBT) and the taxi time to pad or a constraint such as the calculated take-off time (CTOT) which should not be violated in the event that aircraft de-icing is required.

The de-icing module 115 may comprise two components. Firstly, a forecast component or module may be configured to identify the demand of de-icing resources due to traffic demand and weather forecast in a pre-tactical time horizon. The horizon is usually a number of hours in advance.

A planning component or module is configured to generate an optimal sequence for remote de-icing pads and the optimal allocation of de-icing trucks to flights for on-stand de-icing based on one or more constraints. The constraints usually comprise an air traffic control (ATC) slot, a planned departure sequence and so on in a predetermined time horizon, which may be around 60 minutes in advance.

De-Icing Forecast Module

The de-icing module determines potential de-icing demand of aircraft in advance. The objective of this planning is to identify how the de-icing situation will evolve and what has to be done to cope with this situation. The tool allows investigating and comparing different what-if scenarios to see the effect of different measures. The results may be displayed on a screen.

The basis for the calculation and forecast of the de-icing demand are flight plan data, the expected de-icing procedure (de-icing duration per aircraft type) and the de-icing status (percentage of flights to be de-iced). De-icing procedure and de-icing status strongly depend on weather data. The system user adjusts procedure and status according to his interpretation of the weather situation and forecast and his experiences. In addition to the general parameter setting the user can select specific procedures for individual flights so that a specific de-icing demand e.g. for flights that parked overnight at the airport can be considered in the calculation of the overall demand.

In any case this data set allows to generate and to forecast the de-icing demand for a selected time frame.

In the second step the user can evaluate the needed or available de-icing resources. Dependent on the site specific situation the de-icing resources can be de-icing pads and lanes for remote de-icing, de-icing trucks for on stand de-icing or even a combination of both.

The system may be configured to identified how much de-icing capacity must be provided to match with the expected demand or if the demand exceeds the capacity even if the maximum will be provided. In these situations the expected average and maximum delay is also calculated. This planning can be repeated several times using modified parameters to identify the optimal configuration.

The system However, very strong de-icing situations will not allow to de-ice all flights in time so that delays cannot be avoided.

Feedback from the de-icing module to the pre-departure sequence module 101 may allow for certain flights to be prioritised over others based on the target take off time and the time required to de-ice a particular aircraft in the sequence of flights.

De-Icing Planning Module

This is the tactical part of the de-icing system. Here the de-icing sequence for the de-icing pads and the on-stand de-icing is planned and displayed to the user. The allocation is done under consideration of several parameters like individual aircraft de-icing time, minimum separation between two on pad de-icings, dependencies of pads or lanes on a pad due to aircraft size, transfer time for de-icing trucks between stands plus set-up time at the stand, ATC slots, priorities etc.

Thus, it will be appreciated that the application 117 interacts with the airline's Departure Control System, usually via the web check-in server 101 in order to validate the booking reference. This may be performed by way of Web Services Description Language, WSDL, Simple Object Access Protocol (SOAP), or Extensible Markup Language, XML, or using a REST\JSON API call but other messaging protocols for exchanging structured information over a network will be known to the skilled person.

From the foregoing, it will be appreciated that the system, device and method may include a computing device, such as a desktop computer, a laptop computer, a tablet computer, a personal digital assistant, a mobile telephone, a smartphone.

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C #, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

The invention claimed is:

1. A computer processing system for optimising a sequence of aircraft at an airport, the system comprising:

a first module (201) configured to receive flight plan data associated with a plurality of journeys between an origin and destination wherein each journey is associated with a different aircraft and wherein the flight plan data comprises flight schedule data associated with a plurality of different journeys;

a second module (205) coupled to the first module wherein the second module is configured to determine an aircraft taxi time (EXOT) based on the flight plan data; and a third module (203) coupled to the first module (201) and the second module (205), wherein the third module (203) is configured to determine a target take-off time (TTOT) associated with each of the plurality of different journeys, the TTOT is determined based on the EXOT and the flight plan data, and the third module (203) is further configured to determine a target start-up approval time (TSAT) based on the TTOT.

2. A computer processing system according to claim 1, wherein the system is configured to control a plurality of different aircraft associated with the sequence according to a determined sequence or the TTOT.

3. The computer processing system according to claim 1, wherein the third module (203) is further configured to associate the TTOT for each journey with the flight plan data for each journey.

4. The computer processing system according to claim 1, further comprising sending means for sending the flight plan data and the TSAT for each journey to a further system.

5. The computer processing system according to claim 1, wherein the third module is configured to associate the TSAT with the flight plan data for each journey.

6. The computer processing system of claim 1, wherein the flight plan data comprises any one or more of data defining a target off-block time, data defining a runway, data defining a call sign, data defining an aircraft type, data defining an aircraft registration, data defining the origin and destination, data defining different time stamps, estimates, or actual times for time stamps.

7. The computer processing system of claim 1, wherein the first module (201) or second module (205) is communicatively coupled to a system for generating or storing a plurality of flight plans and wherein the third module (203) is configured to associate a plurality of different flight plans with a plurality of different TTOTs for each journey and a plurality of different TSATs for each journey.

8. The computer processing system of claim 1, wherein the third module (203) is further configured to optimise a sequence of aircraft based on minimising a temporal separation between sequential aircraft determined based on an aircraft size, a departure route, different speed classes for each aircraft wherein a minimum temporal separation between sequential aircraft is selected based on whether a first aircraft in the sequence of aircraft is the same type or size as a second aircraft in the sequence of aircraft and wherein the separation is defined by the size of the aircraft.

9. The computer processing system of claim 1, further comprising a user interface for providing access to accessing the data associated with each journey and for accessing the flight plan data.

10. The computer processing system of claim 1, further comprising a fourth module (113) for monitoring events associated with an aircraft turnaround process wherein the events comprise an actual landing time, an actual in block time, a begin or end time for fuelling.

11. The computer processing system of claim 1, wherein the third module (203) is further configured to trigger one or more updates to an event associated with an aircraft based on a deviation between a target and actual times associated with a further, different event.

12. The computer processing system of claim 1, comprising a fifth module (115) configured to optimise an aircraft de-icing process based on at least one of an aircraft type or a determined location associated with the aircraft de-icing process.

13. The computer processing system of claim 1, comprising a fifth module (115) configured to optimise an aircraft de-icing process based on at least one of an aircraft type or a determined location associated with the aircraft de-icing process, wherein the fifth module (115) is coupled to the third module (203).

14. The computer processing system of claim 1, further comprising a further module (119) communicatively coupled to the third module (203) and wherein the further module is configured to determine an actual arrival and departure capacity of an airport and wherein the actual arrival and departure capacity is determined based on any one or more of data defining weather conditions, and traffic demand and wherein the further module (119) is configured to provide unidirectional data exchange between the third module (203) and the further module (119).

15. The computer processing system of claim 1, comprising a fifth module (115) configured to optimise an aircraft de-icing process based on at least one of: an aircraft type or a determined location associated with the aircraft de-icing process wherein the fifth module (115) is coupled to the third module (103) and configured to allow bi-directional data exchange between the fifth module (115) and the third module (103).

16. The computer processing system of claim 1, wherein each of the modules are associated with a single data framework.

17. A computer processing system (101) for optimising a sequence of aircraft at an airport, the system comprising means for:

receiving flight plan data associated with a plurality of journeys between an origin and destination wherein each journey is associated with a different aircraft and wherein the flight plan data comprises flight schedule data associated with a plurality of different journeys;

determining an aircraft taxi time (EXOT) based on the flight plan data;

determining a target take-off time (TTOT) associated with each of the plurality of different journeys wherein the TTOT is determined based on EXOT and the flight plan data; and determining a target start-up approval time (TSAT) based on the TTOT.

18. A method for optimising a sequence of aircraft at an airport, the method comprising:

receiving, with a first module (201), flight plan data associated with a plurality of journeys between an origin and destination wherein each journey is associated with a different aircraft and wherein the flight plan data comprises flight schedule data associated with a plurality of different journeys;

determining, with a second module (205), an aircraft taxi time (EXOT) based on the flight plan data;

determining, with a third module (203), a target take-off time (TTOT) associated with each of the plurality of different journeys wherein determining the TTOT is based on the EXOT and the flight plan data; and determining, with the third module (203), a target start-up approval time (TSAT) based on the TTOT.

19. The method of claim 18, further comprising associating, with the third module (203), the TTOT for each journey with the flight plan data for each journey.

20. The method of claim 18, wherein the TSAT is associated with the flight plan data for each journey.

* * * * *